US012529646B2

(12) United States Patent
Sorret et al.

(10) Patent No.: US 12,529,646 B2
(45) Date of Patent: Jan. 20, 2026

(54) TEST CHAMBER FOR PHOTOSTABILITY TESTING

(71) Applicant: Lonza Ltd, Visp (CH)

(72) Inventors: Lea Sorret, Basel (CH); Ahmed Besheer, Basel (CH); Maximilian Wozniewski, Basel (CH); Martin Vogt, Basel (CH)

(73) Assignee: Lonza Ltd (CH)

( * ) Notice: Subject to any disclaimer, the term of this patent is extended or adjusted under 35 U.S.C. 154(b) by 355 days.

(21) Appl. No.: 18/279,973

(22) PCT Filed: Mar. 4, 2022

(86) PCT No.: PCT/EP2022/055613
§ 371 (c)(1),
(2) Date: Sep. 1, 2023

(87) PCT Pub. No.: WO2022/184913
PCT Pub. Date: Sep. 9, 2022

(65) Prior Publication Data
US 2024/0151632 A1    May 9, 2024

Related U.S. Application Data

(60) Provisional application No. 63/157,212, filed on Mar. 5, 2021.

(30) Foreign Application Priority Data

Aug. 25, 2021  (EP) ..................................... 21192981

(51) Int. Cl.
*G01N 17/00* (2006.01)
*G02B 5/28* (2006.01)

(52) U.S. Cl.
CPC ......... *G01N 17/002* (2013.01); *G01N 17/004* (2013.01); *G02B 5/283* (2013.01)

(58) Field of Classification Search
CPC ..... G01N 17/002; G01N 17/004; G02B 5/283
See application file for complete search history.

(56) References Cited

U.S. PATENT DOCUMENTS

| 3,675,477 | A | 7/1972 | Allen |
| 2004/0233520 | A1 | 11/2004 | Ketola et al. |
| 2007/0009397 | A1 | 1/2007 | Hehl |
| 2008/0169428 | A1 | 7/2008 | Schoenlein |

FOREIGN PATENT DOCUMENTS

| CN | 202421031 U | * | 9/2012 |
| JP | S60 144641 | | 7/1985 |
| JP | S61 73056 | | 4/1986 |
| JP | 2009040937 | | 2/2009 |
| JP | 2010018687 | | 1/2010 |

\* cited by examiner

*Primary Examiner* — Stephen D Meier
*Assistant Examiner* — Quang X Nguyen
(74) *Attorney, Agent, or Firm* — Pandiscio & Pandiscio

(57) ABSTRACT

The present disclosure provides an ultraviolet light filter for use in photostability testing chambers, and in particular, filters that are designed to allow for air ventilation and maintenance of desired temperatures at the sample level during light exposure testing.

20 Claims, 9 Drawing Sheets

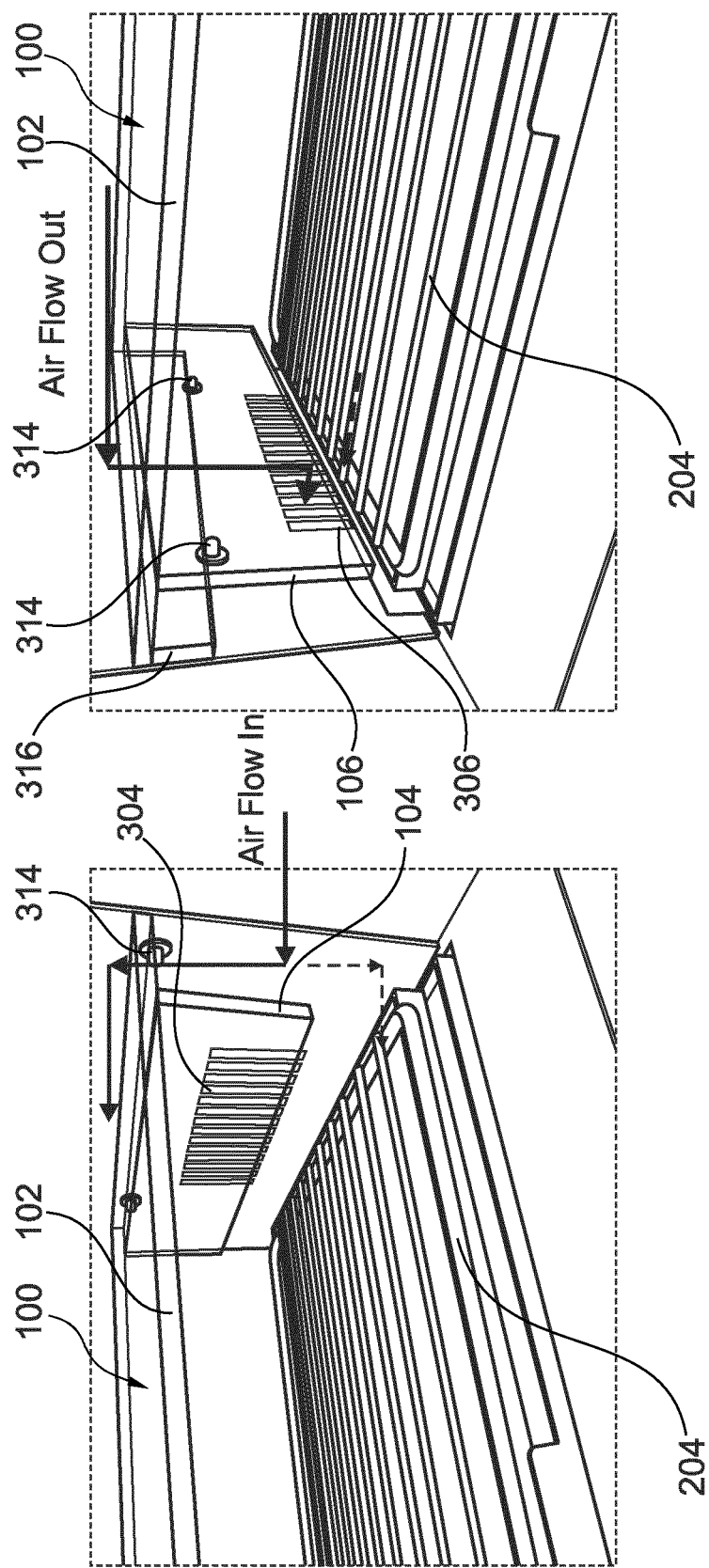

*For samples with added filter, the UV radiation exposure is < 1W/m2

TEST CHAMBER FOR PHOTOSTABILITY TESTING

REFERENCE TO PENDING PRIOR PATENT APPLICATIONS

This patent application is a 371 U.S. national stage entry of pending prior International (PCT) Patent Application No. PCT/EP2022/055613, filed 4 Mar. 2022 by Lonza Ltd for TEST CHAMBER FOR PHOTOSTABILITY TESTING, which patent application in turn, claims benefit of: (i) U.S. Provisional Patent Application Ser. No. 63/157,212, filed Mar. 5, 2021, and (ii) European Patent Application No. 21 192 981.5, filed 25 Aug. 2021.

The three (3) above-identified patent applications are hereby incorporated by reference.

FIELD OF THE INVENTION

The present disclosure provides a filter that limits the amount of transmitted ultraviolet light for use in a photostability testing chamber. The filter allows for more consistent application of visible and ultraviolet light during stability testing of a drug product.

BACKGROUND OF THE INVENTION

US 2008/169428 A1 discloses a device comprising a chamber in which a UV radiation source and an enclosure are arranged, the enclosure comprising a bottom wall for mounting a specimen, a UV radiation filter facing the bottom wall and a plurality of sidewalls interconnecting the bottom wall and the UV radiation filter.

During the handling, transport, management, and storage of biological materials and pharmaceutical drugs, physical and environmental conditions such as light, temperature and humidity can have deteriorating effects on the composition of the material. It is therefore necessary to perform photostability testing of drug products to ensure the safety and effectiveness of the drug during these events.

Requirements for photostability testing are determined by the ICH Harmonized Tripartite Guidelines on Stability Testing of New Drug Substances and Products Q1B guidelines. The ICH guidelines provide instruction for photostability testing studies of new pharmaceutical drug substances and drug products, which is mandatory for the entrance of these new drugs into the global market.

Current minimum ICH requirement leads to almost 3× over-exposure in the ultraviolet (UV) range during photostability testing. This overexposure of UV light can cause significant degradation in the composition of the drug and creates the need for photostability testing methods that reduce unnecessary over exposure in the UV range. In order to ensure light exposure does not lead to unacceptable changes in marketable drug substances and drug products, methods and structures that prevent the overexposure of ultraviolet light are needed.

SUMMARY OF THE INVENTION

In some embodiments provided herein is a filter for use in a photostability testing chamber, the filter comprising: a first planar structure configured to span a horizontal cross-section of the photostability chamber, a first baffle spaced from a first edge of the first planar structure and extending from a lower surface of the first planar structure, a second baffle spaced from a second edge of the first planar structure and extending from the lower surface of the first planar structure, wherein the first edge and the second edge are opposing edges of the first planar structure, a first through opening in the first planar structure located between the first edge and the first baffle, a second through opening in the first planar structure located between the second edge and the second baffle, wherein the filter is configured to be suspended within the photostability chamber, and wherein the first planar structure comprises a polymer that limits at least 30% transmission of ultraviolet light.

In additional embodiments, provided herein is a photostability testing chamber, comprising an interior chamber having a top surface, a bottom surface and two opposing sidewalls, a light source located on the top surface, a sample platform positioned above the bottom surface, the filter described herein positioned at least 6 cm above the sample platform and below the light source, the filter supported by internal screws on the two opposing sidewalls, an air inlet vent in a first sidewall, an air outlet vent in a second sidewall, wherein the first baffle of the filter is configured to direct air flow from the air inlet vent through the first through opening, across the first planar structure, and through the second through opening; and also below the filter into the sample area, and out of the air outlet vent.

The present disclosure is also directed to a method of exposing a compound to ultraviolet light and visible light, comprising: positioning a compound on a sample platform of a photostability testing chamber of the invention, exposing the compound to ultraviolet light and visible light from a single light source, wherein the ultraviolet light and visible light pass through the filter described herein and the ultraviolet light is filtered prior to reaching the compound. Additional samples may also be placed on the filter itself for simultaneous comparison of samples below the filter and above the filter.

BRIEF DESCRIPTION OF THE FIGURES

FIGS. 3A-3C show internal views of a photostability testing chamber as described herein.

FIG. 6A shows a loss of content in insoluble aggregates for albumin and mAb IV after the harshest UV exposure condition (3×ICH minimum requirement for UV light, or 1200 Wh/m$^2$ UV exposure and 3.6 million Lux h in visible light exposure). FIG. 6B shows that no loss of protein content is observed for all molecules tested in the photostability chamber with the added UV-filter (3.6 million Lux h exposure of visible light, negligible UV light).

FIG. 7A shows a loss in the main peak for selected molecules when exposed to UV and visible light conditions up to 3×ICH minimum requirements for UV light (UV radiation of 1200 Wh/m$^2$ and 3.6 million Lux h of visible light exposure), indicating a decrease in sample purity. FIG. 7B shows the effect of visible light exposure (3.6 million Lux h exposure of visible light, negligible UV light due to the presence of the UV filter) on the sample purity of model molecules measured by SE-HPLC. No relevant changes in purity are observed with visible light exposure only.

FIG. 8A shows the effect of the UV filter on measured radiation level at sample level. There was an observed >98% reduction in UV radiation when using the filter. FIG. 8B shows the impact of the UV filter on the measured temperature at the level of the samples on the sample platform. As shown, there was no difference in temperature measured in the chamber with and without filter.

DETAILED DESCRIPTION OF THE INVENTION

The production and distribution of high quality and uncompromised drug products require photostability testing procedures that effectively measure the impact of light exposure on the integrity of the products. Current ICH Q1B guidelines for minimum exposure require ≥1.2 million lux hours (visible range 400-800 nm) and ≥200 W*hours/m$^2$ (UV range 320-400 nm). These photostability test requirements have been particularly challenging due to the resulting overexposure to ultraviolet light by over 200%, when following ICH Q1B guidelines for minimum exposure requirements in the visible region, when utilizing a single light source for both wavelength ranges. In conditions of overexposure to UV light, proteins absorb ultraviolet light, and the energy is passed along photochemical pathways which leads to potential degradation of the protein structure, leading to the compromised safety and efficacy of the drug product.

At present, no single light source provides the combination of simultaneous UV and visible exposure levels required by regulatory requirements, without causing over exposure in the UV range. Because of this limitation, Option 2 of the ICH guidelines are often used, in which two separate experimental setups need to be performed, each with a different light source, one emitting only UV light and one emitting only visible light. This set-up is less ideal due to the limitations of potential representative material, time, and resources required. Thus, there is a great need for photostability testing methods and apparatus which allow for simultaneous exposure to UV light and visible light that meet ICH Q1B requirements.

The addition of an anti-UV filter inside the test chamber raises potential issues regarding the temperature of the chamber, as well as potential aging of the filter material and reduction of transmission in the visible range. Due to increased temperatures caused by increased heat generated by UV light sources, photostability instruments are usually equipped with air cooling systems to control the temperature in specific ranges. The present disclosure provides filters and methods that filter UV light while allowing passage of visible light within a photostability testing chamber to allow for regulatory requirements of photo stress testing in a controlled temperature environment.

Figure 1:
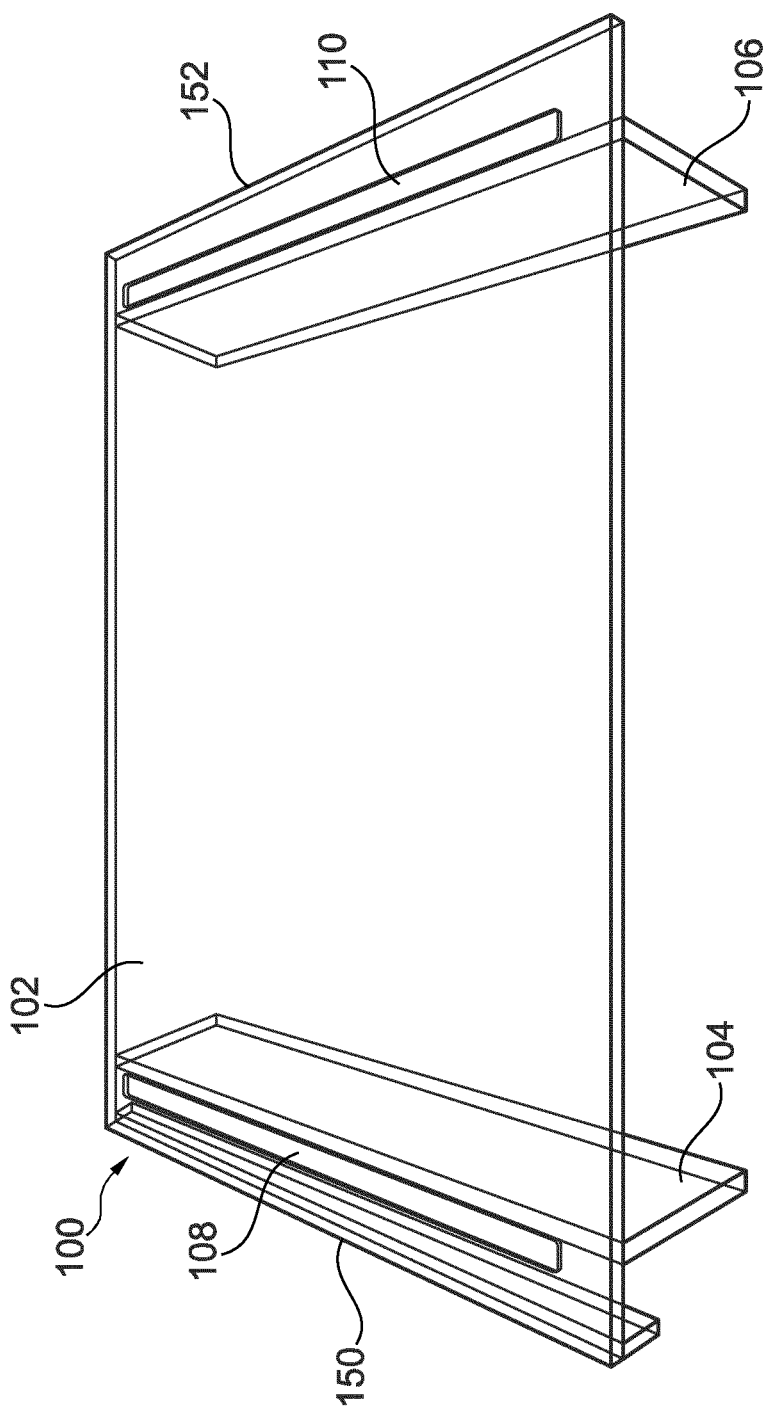
FIG. 1 shows a filter for use in a photostability chamber as described herein.
Figure 2:
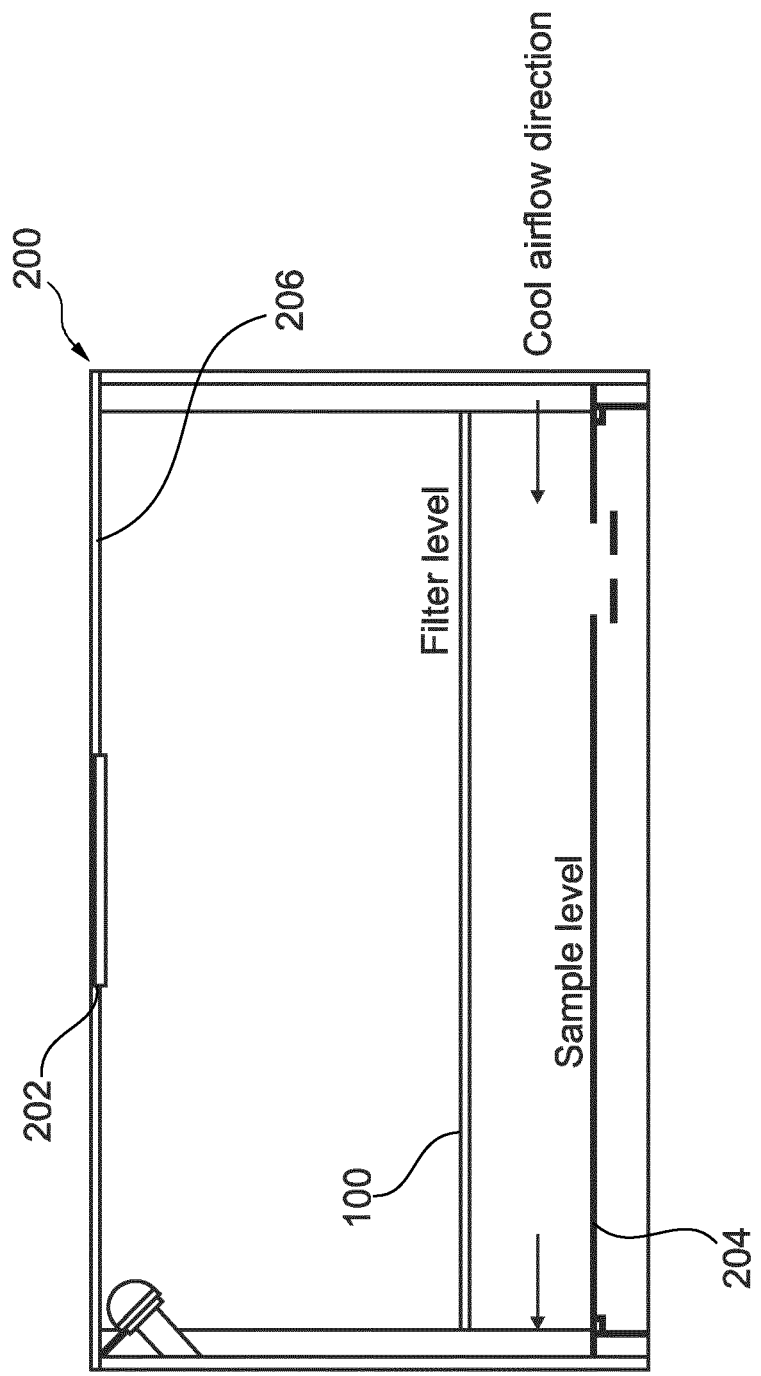
FIG. 2 shows an overview of a photostability testing chamber as described herein.
Figure 3A:
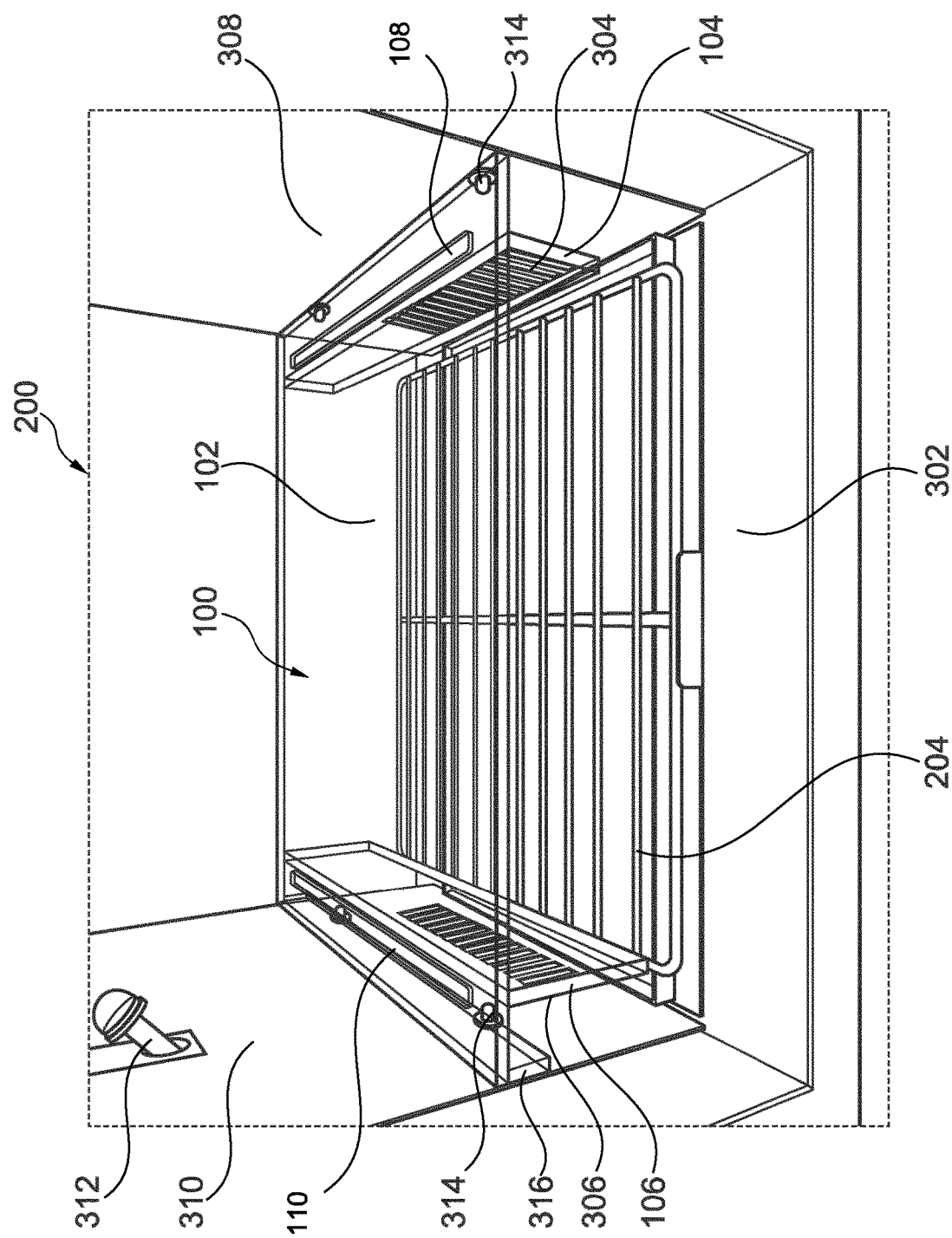

In embodiments, provided herein is a filter for use in a photostability chamber. FIG. 1 shows an exemplary filter 100, that includes a first planar structure 102 configured to span a horizontal cross-section of the photostability chamber. FIG. 2 shows the placement of filter 100 within photostability chamber 200, illustrating how the filter spans the horizontal cross-section (i.e., the width of the chamber). FIG. 3A shows an additional view within the interior of the photostability chamber 200, with filter 100 spanning the cross-section of the interior of the chamber.

As shown in FIG. 1, in embodiments, filter 100 includes a first baffle 104 spaced from a first edge of the first planar structure 102 and extending from a lower surface of the first planar structure 102. As used herein, "baffle" refers to a solid structure, suitably of the same material as filter 100, that extends below the first planar structure 102. Baffle can be formed from the same material as filter 100, in particular first planar structure 102, (i.e., in a molding process) or can be structurally attached to planar structure 102, via glue, adhesives, welds, screws, various tongue and groove mechanisms, etc. FIG. 3A provides another view of the first baffle 104 within the interior of the photostability chamber 200. As used herein, "planar structure" refers to a substantially flat, rectangular, or square-shaped (though other shapes can also be used), filter element that suitably has a thickness on the order of about 1 mm to about 5 cm, more suitably about 10 mm to about 1 cm, or about 10 mm to about 0.5 cm.

As shown in FIG. 1, in embodiments, filter 100 includes a second baffle 106 spaced from a second edge of the first planar structure 102 and extending from the lower surface of the first planar structure 102, wherein the first edge (150) and the second edge (152) are parallel and opposing edges of the first planar structure. The second baffle 106 can also be seen in FIG. 3A within the interior of the photostability chamber 200.

As shown in FIG. 1, in embodiments, filter 100 includes a first through opening 108 in the first planar structure 102 located between the first edge and the first baffle 104. As used herein, "through opening" refers to a hole cut completely through the first planar structure 102. Through opening can be cut as a single hole or multiple holes, or as a continuous or broken slit, in the first planar structure 102 including holes of different shapes, lengths and widths between the first edge and first baffle 104. An additional view of the first through opening 108 is shown in FIG. 3A of the interior of the photostability chamber 200. As shown in FIG. 1, in embodiments, filter 100 includes a second through opening 110 in the first planar structure 102 located between the second edge and the second baffle 106. The second through opening 110 is shown within the interior of the photostability chamber in FIG. 3A.

As shown in FIG. 3A, in embodiments, the first edge of filter 100 further comprises a support ledge 316 extending below the first planar structure 102. As used herein, "support ledge" refers to a solid extension from a lower surface of the first planar structure 102 at the first edge of filter 100. Support ledge can be formed from the same material as filter 100 or can be structurally attached to planar structure 102, via glue, adhesives, welds, screws, various tongue, and groove mechanisms, etc.

In embodiments, first planar structure 102 suitably has a length between about 20 cm to about 50 cm and a width between about 25 cm to about 50 cm and comprises a polymer that limits at least 30% transmission of ultraviolet light. In additional embodiments, the length of first planar structure 102 can be about 25 cm to about 40 cm, or about 30 cm, and the width can be between about 35 cm and about 45 cm or about 30 cm. In additional embodiments, the length of first planar structure 102 can be about 30 cm to about 45 cm, or about 35 cm, and the width can be between about 40 cm and about 50 cm or about 35 cm. In additional embodiments, the length of first planar structure 102 can be about 35 cm to about 50 cm, or about 40 cm, and the width can be between about 45 cm and about 55 cm or about 40 cm. In additional embodiments, the length of first planar structure 102 can be about 40 cm to about 55 cm, or about 45 cm, and the width can be between about 50 cm and about 60 cm or about 45 cm. In additional embodiments, the length of first planar structure 102 can be about 45 cm to about 60 cm, or about 50 cm, and the width can be between about 55 cm and about 65 cm or about 50 cm. In additional embodiments, the length of first planar structure 102 can be about 50 cm to about 65 cm, or about 55 cm, and the width can be between about 60 cm and about 70 cm or about 65 cm. In additional embodiments, the length of first planar structure 102 can be about 55 cm to about 70 cm, or about 60 cm, and the width can be between about 65 cm and about 75 cm or about 70 cm. In additional embodiments, the length of first planar structure 102 can be about 60 cm to about 75 cm, or about 65 cm, and the width can be between about 70 cm and about 80 cm or about 75 cm. In additional embodiments, the length of first planar structure 102 can be about 65 cm to about 80 cm, or about 70 cm, and the width can be between about 75 cm and about 85 cm or about 70 cm. In additional embodiments, the length of first planar structure 102 can be about 70 cm to about 85 cm, or about 75 cm, and the width can be between about 80 cm and about 90 cm or about 85 cm. In additional embodiments, the length of first planar structure 102 can be about 75 cm to about 90 cm, or about 80 cm, and the width can be between about 85 cm and about 95 cm or about 90 cm.

In embodiments, provided herein the first planar structure 102 has a width and length dimensions that adequately span the interior of the photostability chamber it is being configured to be placed in, including those dimensions provided herein.

In embodiments, provided herein is the filter 100, wherein the polymer limits at least 50% transmission of ultraviolet light. In further embodiments, the polymer of the filter 100 limits at least about 20% transmission of ultraviolet light, at least about 30%, at least about 40%, at least about 50%, at least about 60%, at least about 70%, at least about 75%, at least about 80%, at least about 85%, at least about 90%, at least about 95%, or about 50% to about 95%, about 60% to about 95%, about 70% to about 95%, or about 80% to about 95%, transmission of ultraviolet light. Limiting transmission of ultraviolet light to a desired percent (%) indicates that the measure of UV transmission (e.g., W*hours/m$^2$) is reduced by that percentage amount.

Exemplary materials for use in filter 100 that provide the desired UV light filtering include various glasses and polymers, and suitably include acrylamide. Additional materials that can be used in filter 100 include acetate and various acrylics. Glass materials can also be used that include UV filtering materials dispersed therein.

In further embodiments, provided herein is a photostability chamber for use in UV and visual light testing of a drug product. FIG. 2 shows an exemplary photostability chamber 200 with an interior chamber having a top surface 206, a bottom surface 302 and a first chamber sidewall 308 and a second chamber sidewall 310 (see FIG. 3). As used herein, "top surface" refers to a solid structure spanning the horizontal uppermost section of photostability test chamber 200. As used herein, "bottom surface" refers to a solid structure spanning the horizontal base of the photostability test chamber 200. As used herein, "chamber sidewall" refers to an enclosure that spans vertically between the top surface and bottom surface of photostability chamber 200 (i.e., the height of the chamber).

As shown in FIG. 2, in embodiments, photostability chamber 200 includes a light source 202 located on the top surface 206. As used herein, "light source" refers to an instrument that emits both UV and visible light from the top surface 206 onto the interior of photostability chamber 200.

As shown in FIG. 2, in embodiments, photostability chamber 200 includes a sample platform 204 positioned above the bottom surface. As used herein, "sample platform" refers to an additional surface that is raised above the bottom surface of the photostability chamber 200 upon which samples can be placed for testing. Sample platforms can be a solid surface, metal rack or grids.

As shown in FIG. 3A, in embodiments, filter 100 is configured to be suspended on internal screws 314 within the photostability chamber 200. As used herein, "internal screw" refers to a fastener inserted into or on the first chamber sidewall 308 or second chamber sidewall 310. Internal screws 314 can be attached into or to side chamber sidewall by drilling, glue, and other adhesives. Other supports within photostability chamber 200 can also be used to support filter 100 as it spans the dimensions of the chamber.

In embodiments, photostability chamber 200 includes the filter 100 positioned at least 6 cm above the sample platform 204 and 20 cm below the light source 202, the filter 100 supported by internal screws 314 on the first chamber sidewall 308 and the second chamber sidewall 310. Additional spatial relationships can also be used, for example, positing the filter between 3 cm and 20 cm above the sample platform, or between 5 cm and 10 cm above the sample platform, while maintaining a distance of between about 15 cm and 30 cm below the light source.

As shown in FIG. 3A, in embodiments, photostability chamber 200 includes an air inlet vent 304 in the first sidewall chamber 308. As used herein, "air inlet vent" refers to an opening in the first sidewall chamber 308 from which air or gas passes through into the photostability chamber 200. A closer look at air inlet 304 can be seen in FIG. 3B showing the aeration of the photostability chamber 200 through air inlet 304, including the direction of air flow (in). Air inlet is used to provide air to maintain the temperature of the photostability chamber at the desired range, and allows for the temperature to be raised or lowered as desired to test various conditions on the samples.

As shown in FIG. 3A, in embodiments, photostability chamber 200 includes an air outlet vent 306 in the second sidewall 310. As used herein, "air outlet vent" refers to an opening in the second sidewall chamber 310 from which air or gas liquid circulating within the photostability chamber 200 passes out of the chamber. An additional view of air outlet 306 is shown in FIG. 3C through which air flow is expelled out of photostability chamber 200.

As shown in FIG. 3A, in embodiments, photostability chamber 200 includes an irradiance intensity sensor 312. As used herein, "irradiance intensity sensor" refers to an instrument that measures the radiant flux (power) received by a surface per unit area.

As shown in FIGS. 3B & 3C, in embodiments, the first baffle 104 of the filter 100 is configured to direct air flow from the air inlet vent 304 through the first through opening 108, across the first planar structure 102, and also below the filter 100 into the sample area, and then through the second through opening 110 or sample area and out of the air outlet vent 306. This air circulation has been determined to be important to maintain the temperature of the sample and the chamber at the desired value or range, and also allows for the testing of samples above filter 100, if so desired.

The filter 100 can also be inserted into the photostability testing chamber in a position rotated about a vertical axis by 180° from the position shown in FIG. 3A-3C. In that case, the first edge, first through opening and first baffle serve as second edge, second through opening and second baffle, respectively, and vice versa.

Figure 5:
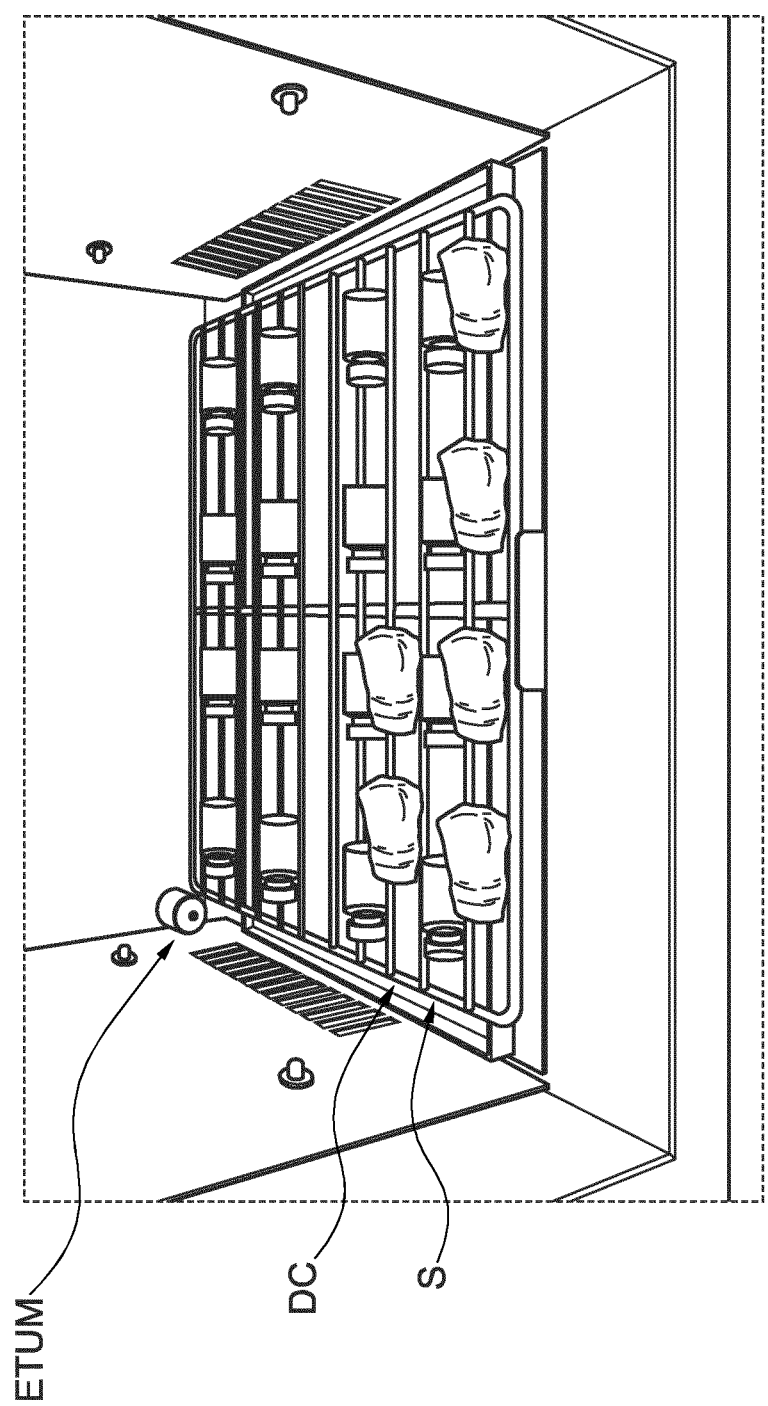
FIG. 5 shows the experimental set-up of the light exposure test of samples in a photostability testing chamber. Sample vials S and covered vials (dark controls (DC)) are placed on sample rack. External temperature and ultraviolet exposure are each measured by a meter ETUM placed at the sample level. The external temperature probe is not shown in FIG. 5.

In additional embodiments, provided herein is a method of exposing a compound to at least about 200 W*h/m$^2$ of ultraviolet light and at least about 1.2 million Lux*h visible light, comprising positioning a compound on a sample platform 204 of a photostability testing chamber 200 and exposing the compound to ultraviolet light and visible light from a single light source 202, wherein the ultraviolet light and visible light pass through the filter 100 and the ultraviolet light is filtered through the filter 100 prior to reaching the compound. FIG. 5 depicts an experimental setup of this method within the interior of photostability chamber 200 in which samples are placed on a sample platform 204 and tested for sensitivity to light exposure.

In embodiments of the methods described herein, the compound is exposed to at least about 1.2 million Lux*h of visible light but not more than about 500 W*h/m$^2$ of ultraviolet light. Suitably the methods result in the compound being exposed to at least about 1.2 million Lux*h of visible light but not more than about 400 W*h/m$^2$ of ultraviolet light, more suitably not more than about 350 W*h/m$^2$ of ultraviolet light, not more than about 300 W*h/m$^2$ of ultraviolet light, not more than about 250 W*h/m$^2$ of ultraviolet light or not more than about 200 W*h/m$^2$ of ultraviolet light. The temperature above the filter 100 is maintained between about 30° C. to about 40° C., and the temperature of the samples is maintained between about 20° C. and about 40° C.

EXAMPLES

Photostability Chamber Design and Testing

As described herein, the methods provided allow for the control of UV light exposure and temperature in a photostability testing chamber. The addition of a filter that limits overexposure of UV light allows for ICH Q1B testing Option 1, in which one lamp with combined UV and visible light is utilized, and UV and visible light are separated within a photostability testing chamber. FIG. 2 depicts this experimental set-up with one lamp source 202 emitting both UV and visible light.

To maintain air circulation in the photostability chambers, the filter described herein employs pass throughs (i.e., holes or slits) on the sides of the filter, so that air ventilation is possible throughout the light chamber as illustrated in FIGS. 3A-3C. Samples are suitably secured on the sample platform allowing for placement in a sideway orientation (see FIG. 5). If necessary, samples can also be placed on top of the filter for testing. The filter is designed so that it does not need to be fixedly attached to the opposing sidewalls and can be easily inserted or removed from the chamber by simply placing the filter on existing screws within the photostability chamber (see FIGS. 3A-3C). In addition, the filter is designed to be large enough to allow for maximum sample testing and for uniform exposure of the samples to the filter. FIGS. 3A-C depict the experimental set-up of sample and filter placement, and air flow within the testing chamber.

Figure 4:
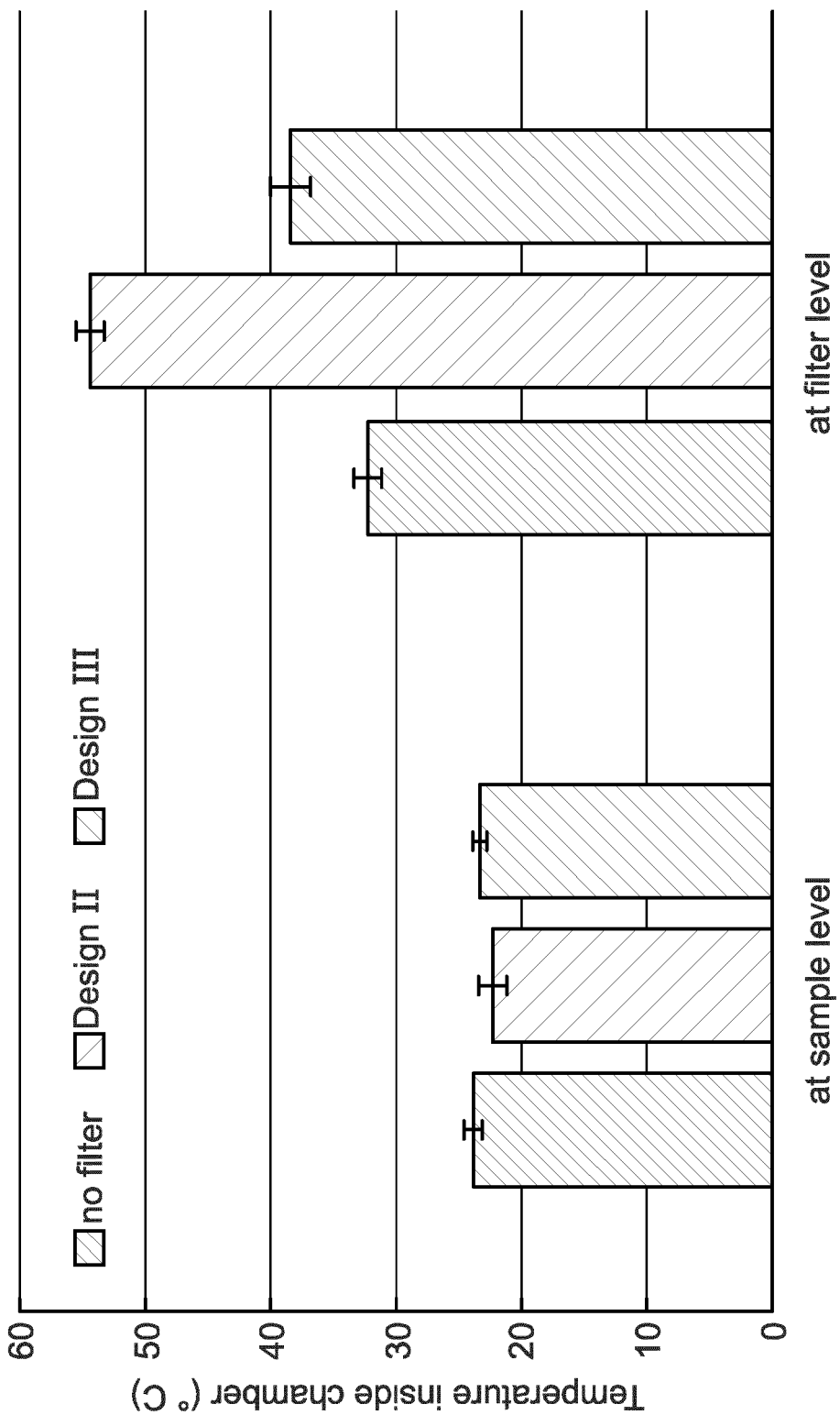
FIG. 4 shows the temperature at sample and filter level of photostability chamber designs: 1) no filter, 2) Design II: flat acrylamide UV filter and 3) Design III: through openings and baffles added for temperature control inside photostability chamber.

To test the efficacy of the filter described herein, samples were exposed to UV in a photostability testing chamber with no filter, a photostability testing chamber with a flat acrylamide UV filter (Design II) and a photostability testing chamber with air through openings and baffles added for temperature control inside light chamber (Design III). Changes due to photodegradation and temperature in the three different experimental setups were compared. FIG. 4 shows the temperature at the sample level and filter level in the three different photostability testing experimental setups. As illustrated, Design III (filter with through openings and baffles) maintained a temperature between about 20-40° C., both above and below the filter.

Table 1 below highlights the experimental set up of methods used to test the impact of UV and visible light vs. visible light only with the addition of the UV-filter during light exposure inside the chamber. Samples were exposed to the settings below, with and without a UV filter as shown in FIG. 5. UV radiation below filter was measured to be <1 W/m$^2$, with chamber temperature: 25+5° C. Lamp irradiance was set at 300-800 nm setting on instrument: 650 W/m$^2$ (including UV radiation of 30 W/m$^2$) 4 sampling points were used (T0-T3).

TABLE 1

| | Experimental Set-Up | | | |
|---|---|---|---|---|
| | T0 | T1 | T2 | T3 |
| Exposure duration | 0 | 6 h | 12 h | 36 h |
| UV exposure (instrument setting) | 0 | 200 W h/m$^2$ | 400 W h/m$^2$ | 1200 W h/m$^2$ |
| Visible light exposure (Lux hr) (instrument setting) | 0 | 0.6 * 10$^6$ Lux h | 1.2 * 10$^6$ Lux h | 3.6 * 10$^6$ Lux h |
| Equivalent ICH Q1B minimum | N/A | Minimum UV requirement | Minimum visible light requirement | 3x minimum visible light ICH Q1B 6x minimum UV requirement |

The samples were examined for changes that can arise after light exposure, in accordance with ICH Q1B. These test methods can show relevant changes due to photodegradation of the sample.

Figure 6A:
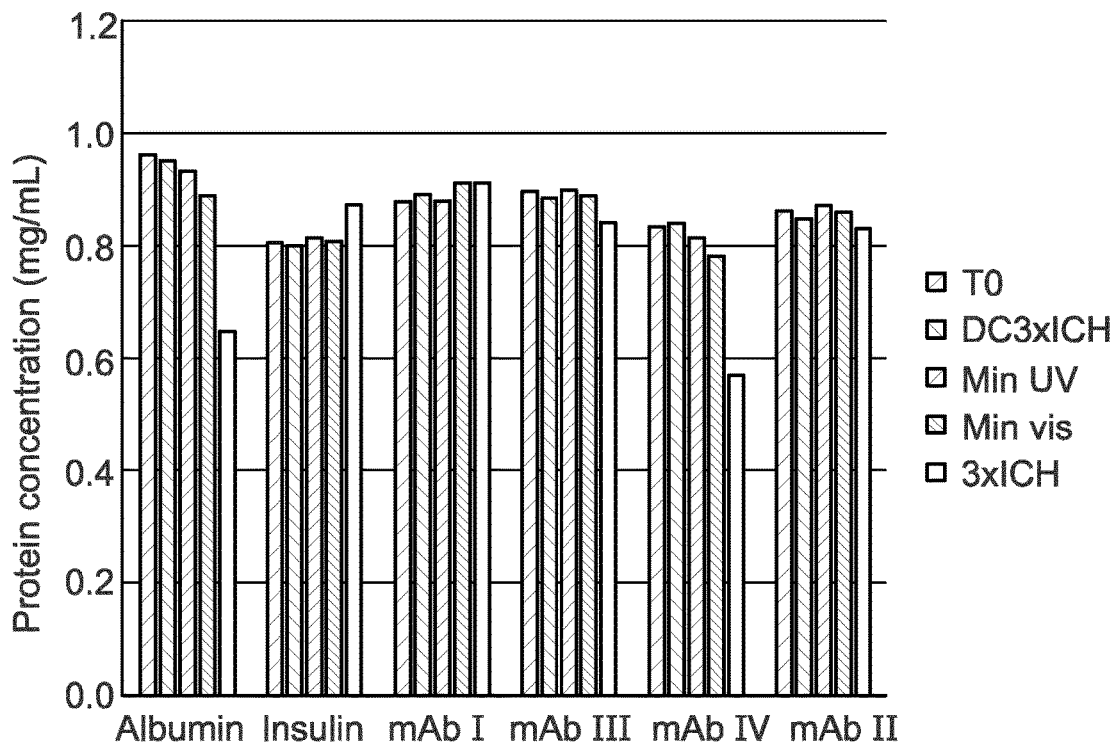
FIGS. 6A-6B show the effect of light exposure on the concentrations of model molecules, measured by UV-vis spectrometry.
Figure 6B:
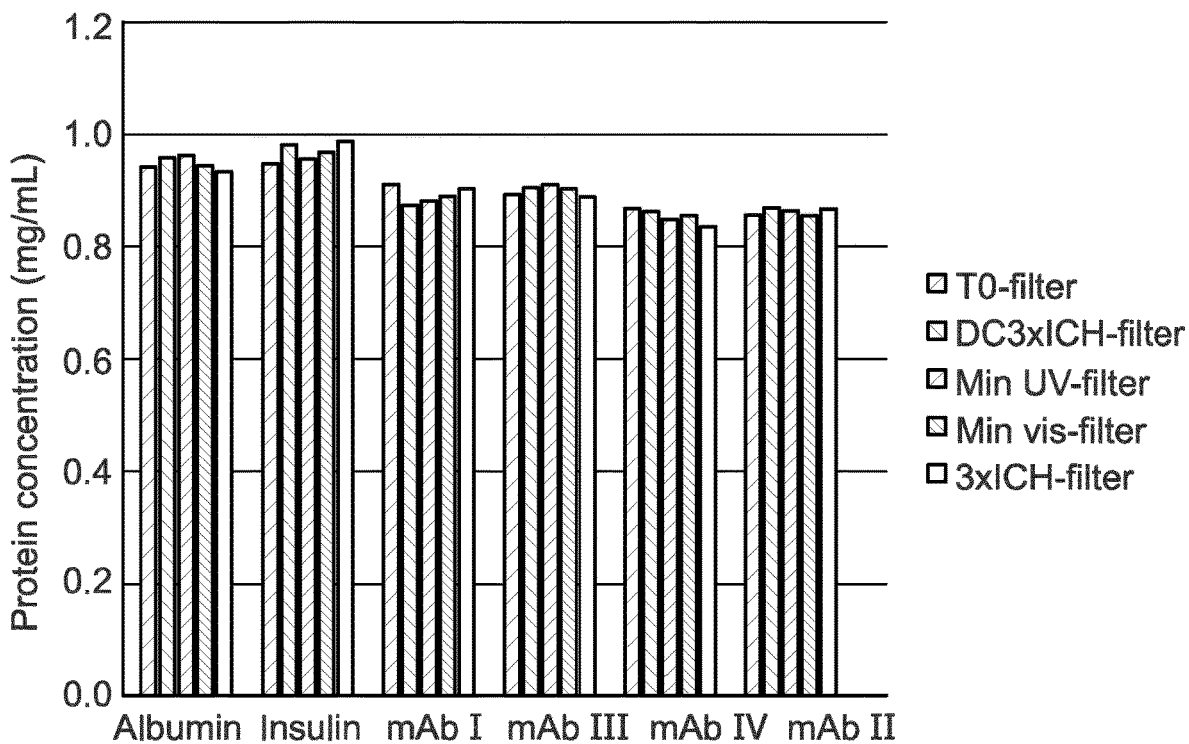

FIGS. 6A-B show the results of UV-visible spectroscopy analysis performed on 1) Albumin, 2) Insulin, 3) mAb I, 4) mAb III, 5) mAb IV and 6) mAb II (mAb indicate example monoclonal antibodies) after light exposure testing in the photostability testing chamber without the UV-filter (FIG. 6A) and with the UV-filter added (FIG. 6B). FIG. 6A shows that without the UV-filter, the harshest exposure condition to light (3×ICH) results in loss of content for albumin and mAb IV in insoluble aggregates that formed in samples tested. FIG. 6B shows that sample exposure to the harshest light condition (3×ICH) with the UV-filter added did not result in any loss of protein content in any of the molecules tested. These results show the impact of overexposure of UV light on the contents of the drug product being tested. These results also provide support for the efficiency of the UV-filter in limiting the exposure of the sample to UV light when following ICH Q1B guidelines and thus, preventing the degradation of the drug sample tested.

Figure 7A:
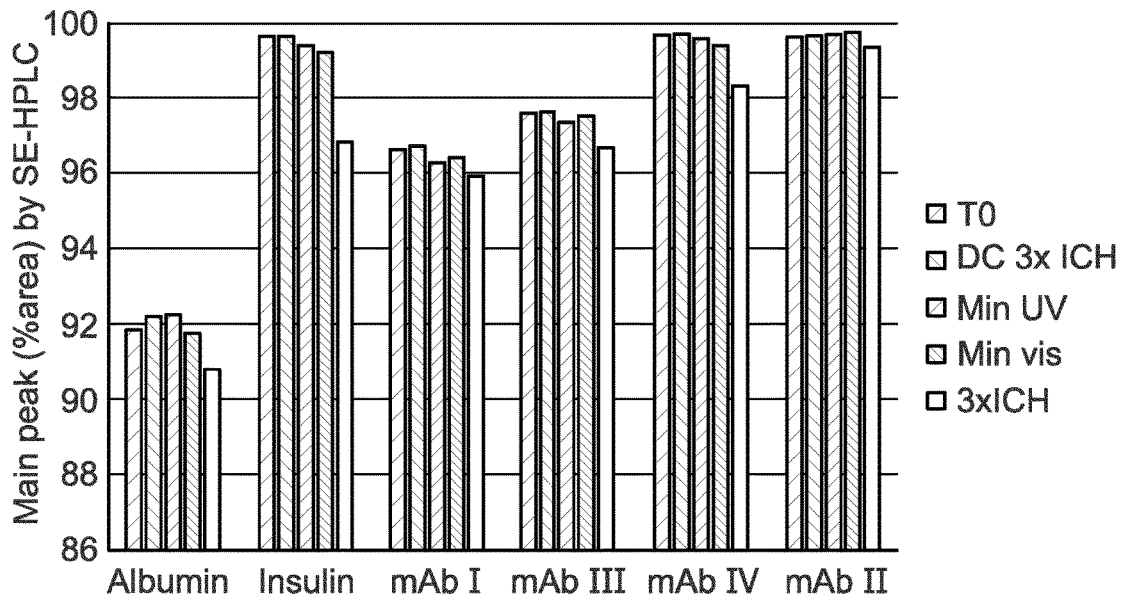
FIGS. 7A-7B display the effect of light exposure on model molecules measured by size exclusion-high performance liquid chromatography (SE-HPLC).
Figure 7B:
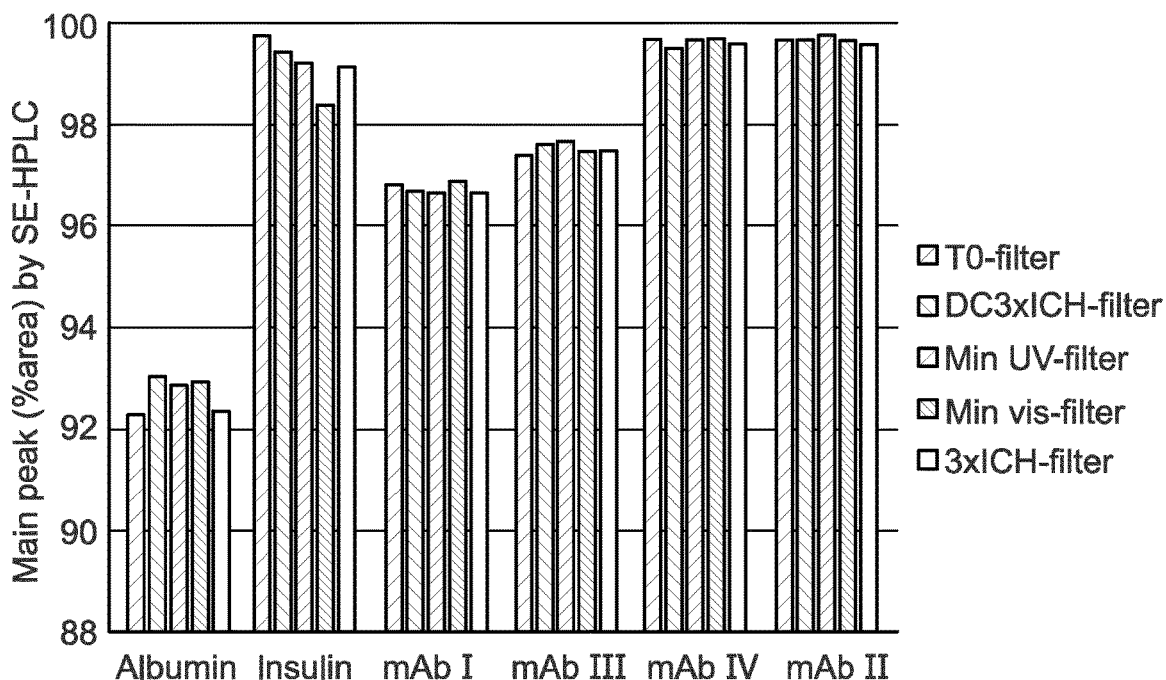

FIGS. 7A-7B show the results of size exclusion chromatography (SE-HPLC) experiments performed on 1) Albumin, 2) Insulin, 3) mAb I, 4) mAb III, 5) mAb IV and 6) mAb II molecules after light exposure testing in the photostability testing chamber without the UV-filter (FIG. 7A) and with the UV-filter added (FIG. 7B). FIG. 7A shows that the sample purity of albumin, insulin, mAb I, mAb III and mAb IV decreases after exposure to light (3×ICH) without the UV-filter, as evidenced by loss in the main peak (percent area) of the molecules tested. There is no change in purity observed for mAb II in this light exposure condition as this molecule is very stable against various stresses as confirmed by previous experiments. FIG. 7B shows that with the addition of the UV-filter in the photostability testing chamber, there was no significant decrease in main peak (percent area) of albumin, insulin, mAb I, mAb III and mAb IV between T0 (no light exposure) and exposure to the harshest light condition (3×ICH). These results show the impact overexposure of UV light has on the purity of the drug product being tested. These results also provide support for the usefulness of the UV-filter in preserving the quality of the drug sample during light exposure photostability testing.

Figure 8A:
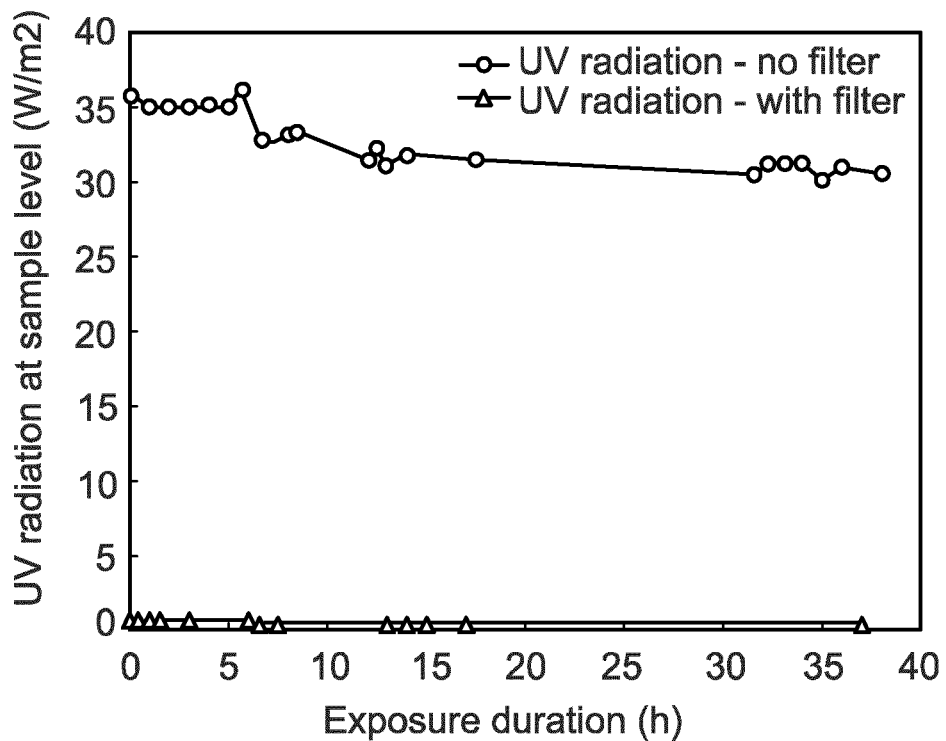
FIGS. 8A-8B display the effects of the UV filter on different experimental parameters.
Figure 8B:
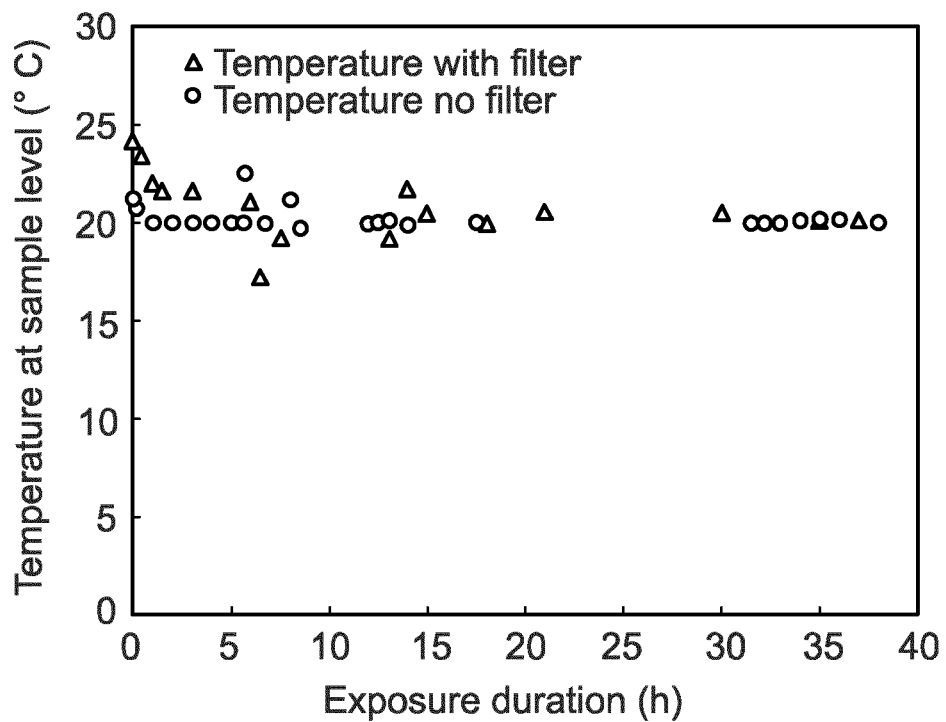

FIGS. 8A-8B show the effect of the addition of the UV filter in the photostability testing chamber on 8A) UV radiation at sample level and 8B) temperature at sample level. FIG. 8A shows that with no UV filter present in the photostability testing chamber, the UV radiation at sample level ranged from 30-35 W/m$^2$ throughout 40 hours of light exposure. Utilization of the UV filter in the chamber resulted in a 98% reduction in observed levels of UV radiation at the sample level, which were detected at <1 W/m$^2$ throughout 40 hours of light exposure. Temperatures at the sample level with and without UV filter were unaffected by the addition of the UV filter as shown in FIG. 8B. There were no significant differences between the temperatures at the sample level without and without the filter.

These results show that using the UV filter design in the photostability testing chamber reduces the UV radiation exposed to the samples and maintains appropriate temperatures between about 5° C. to about 40° C. at the sample level.

In addition to satisfying the UV light, visible light and temperature requirements, the invention is long lasting. The invention is made of acrylic material and therefore has a slow degradation rate with no change in material and optical properties over time. This material is also heat resistant and is easily cut into different shapes, making it adaptable for set-up in different instruments. Transmission in the visible light and longer wavelength range is unchanged with the use of this filter.

Additional Exemplary Embodiments

Embodiment 1 is a filter for use in a photostability chamber according to Embodiment 7, comprising a first planar structure configured to span a horizontal cross-section of the photostability chamber, a first baffle spaced from a first edge of the first planar structure and extending from a lower surface of the first planar structure, a second baffle spaced from a second edge of the first planar structure and extending from the lower surface of the first planar structure, wherein the first edge and the second edge are opposing edges of the first planar structure, a first through opening in the first planar structure located between the first edge and the first baffle, a second through opening in the first planar structure located between the second edge and the second baffle, wherein filter is configured to be suspended within the photostability chamber, and wherein the first planar structure comprises a polymer that limits at least 30% transmission of ultraviolet light.

Embodiment 2 includes the filter of embodiment 1, wherein the first edge and the second edge are parallel.

Embodiment 3 includes the filter of embodiment 1, wherein the polymer limits at least 50% transmission of ultraviolet light.

Embodiment 4 includes the filter of embodiment 1, wherein the first baffle extends below the second baffle.

Embodiment 5 includes the filter of embodiment 1, wherein the first edge further comprises a support ledge extending below the first planar structure.

Embodiment 6 includes the filter of embodiment 1, wherein the first planar structure has a length between about 30 cm to about 50 cm and a width between about 25 cm to about 40 cm.

Embodiment 7 is a photostability testing chamber, comprising an interior chamber having a top surface, a bottom surface and two opposing sidewalls, a light source located on the top surface, a sample platform positioned above the bottom surface, the filter of embodiment 1 positioned at least 6 cm above the sample platform and below the light source, the filter supported by internal screws on the two opposing sidewalls, an air inlet vent in a first sidewall, an air outlet vent in a second sidewall, wherein the first baffle of the filter is configured to direct air flow from the air inlet vent through the first through opening, across the first planar structure, and through the second opening, and also below the filter into the sample area and out of the air outlet vent.

Embodiment 8 includes the photostability chamber of embodiment 7, wherein the filter is not fixedly attached to the opposing sidewalls.

Embodiment 9 includes the photostability chamber of embodiment 7, wherein the first baffle and the second baffle help distribute the air flow above and below the filter.

Embodiment 10 includes the photostability chamber of embodiment 7, wherein the light source emits ultraviolet light and visible light.

Embodiment 11 includes the photostability chamber of embodiment 7, wherein the sample platform is a metal rack or metal plate.

Embodiment 12 includes the photostability chamber of embodiment 7, wherein the filter limits at least 50% transmission of ultraviolet light from the light source from reaching the sample platform.

Embodiment 13 includes the photostability chamber of embodiment 7, further comprising an irradiance intensity sensor.

Embodiment 14 includes the photostability chamber of embodiment 7, wherein the filter is positioned 20 cm below the light source.

Embodiment 15 includes the photostability chamber of embodiment 7, wherein the filter is positioned between about 9 cm to about 12 cm above the sample platform.

Embodiment 16 is a method of exposing a compound to ultraviolet light and visible light, comprising positioning a compound on a sample platform of a photostability testing chamber according to embodiment 7, exposing the compound to ultraviolet light and visible light from a single light source, wherein the ultraviolet light and visible light pass through the filter of embodiment 1 and the ultraviolet light is filtered prior to reaching the compound.

Embodiment 17 includes the method of embodiment 16, wherein a temperature above the filter is maintained between about 5° C. to about 40° C.

Embodiment 18 includes the method of embodiment 16, wherein the compound is exposed to at least about 200 W*h/m$^2$ of ultraviolet light.

Embodiment 19 includes the method of embodiment 16, wherein the compound is exposed to at least about 1.2 million Lux*h visible light.

Embodiment 20 includes the method of embodiment 16, wherein the compound is exposed to at least about 1.2 million Lux*h of visible light but not more than about 500 W*h/m$^2$ of ultraviolet light.

REFERENCE NUMERALS LIST 100 filter
102 first planar structure
104 first baffle
106 second baffle
108 first through opening
110 second through opening
150 first edge
152 second edge
200 photostability chamber
202 light source
204 sample platform
206 top surface
302 bottom surface
304 air inlet vent
306 air outlet vent
308 first chamber sidewall
310 second chamber sidewall
312 irradiance intensity sensor
314 internal screws
316 support ledge
ETUM external temperature and UV meter
DC Dark control
S Sample

What is claimed is:

1. A photostability testing chamber (200), comprising:
   a. an interior chamber having a top surface (206), a bottom surface (302) and two opposing sidewalls (308, 310);
   b. a light source (202) located on the top surface (206);
   c. a sample platform (204) positioned above the bottom surface (302);
   d. a filter (100) comprising:
      i. a first planar structure (102) configured to span a horizontal cross-section of the photostability chamber (200);
      ii. a first baffle (104) spaced from a first edge (150) of the first planar structure (102) and extending from a lower surface of the first planar structure (102);
      iii. a second baffle (106) spaced from a second edge (152) of the first planar structure (102) and extending from the lower surface of the first planar structure (102);
   wherein the first edge (150) and the second edge (152) are opposing edges of the first planar structure (102);
      iv. a first through opening (108) in the first planar structure (102) located between the first edge (150) and the first baffle (104);
      v. a second through opening (110) in the first planar structure (102) located between the second edge (152) and the second baffle (106), wherein the filter (100) is configured to be suspended within the photostability chamber (200), and wherein the first planar structure (102) comprises a polymer that limits at least 30% transmission of ultraviolet light,
   e. the filter (100) being positioned at least 6 cm above the sample platform (204) and below the light source (202), the filter (100) supported by internal screws (314) on the two opposing sidewalls (308, 310);
   f. an air inlet vent (304) in a first sidewall (308); and
   g. an air outlet vent (306) in a second sidewall (310), wherein the first baffle (104) of the filter (100) is configured to direct air flow from the air inlet vent (304):
      through the first through opening (108), across the first planar structure (102), and through the second through opening (110); and also below the filter (100) into the sample area; and out of the air outlet vent (306).

2. The photostability testing chamber of claim 1, wherein the filter (100) is not fixedly attached to the opposing sidewalls (308, 310).

3. The photostability testing chamber of claim 1, wherein the first baffle (104) and the second baffle (106) help distribute the air flow above and below the filter (100).

4. The photostability testing chamber of claim 1, wherein the light source (202) emits ultraviolet light and visible light.

5. The photostability testing chamber of claim 1, wherein the sample platform (204) is a metal rack or metal plate.

6. The photostability testing chamber of claim 1, wherein the filter (100) limits at least 50% transmission of ultraviolet light from the light source from reaching the sample platform (204).

7. The photostability testing chamber of claim 1, further comprising a irradiance intensity sensor (312).

8. The photostability testing chamber of claim 1, wherein the filter (100) is positioned 20 cm below the light source.

9. The photostability testing chamber or claim 1, wherein the filter (100) is positioned between about 9 cm to about 12 cm above the sample platform (204).

10. A filter for use in a photostability testing chamber according to claim 1, comprising:
   a a first planar structure (102) configured to span a horizontal cross-section of the photostability chamber (200);
   b a first baffle (104) spaced from a first edge (150) of the first planar structure (102) and extending from a lower surface of the first planar structure (102);

c. a second baffle (106) spaced from a second edge (152) of the first planar structure (102) and extending from the lower surface of the first planar structure (120);

wherein the first edge (150) and the second edge (152) are opposing edges (150, 152) of the first planar structure (102);

d. a first through opening (108) in the first planar structure (102) located between the first edge (150) and the first baffle (104);

e. a second through opening (110) in the first planar structure (102) located between the second edge (152) and the second baffle (106), wherein the filter is configured to be suspended within the photostability chamber (200), and wherein the first planar structure (102) comprises a polymer that limits at least 30% transmission of ultraviolet light.

11. The filter of claim 10, wherein the first edge (150) and the second edge (152) are parallel.

12. The filter of claim 10, wherein the polymer limits at least 50% transmission of ultraviolet light.

13. The filter of claim 10, wherein the first baffle (104) extends below the second baffle (106).

14. The filter of claim 10, wherein the first edge (150) further comprises a support ledge (316) extending below the first planar structure (102).

15. The filter of claim 10, wherein the first planar structure (102) has a length between about 30 cm to about 50 cm and a width between about 25 cm to about 40 cm.

16. A method of exposing a compound to ultraviolet light and visible light, comprising:

a. positioning a compound on a sample platform (204) of a photostability testing chamber (200) according to claim 1;

b. exposing the compound to ultraviolet light and visible light from a single light source, wherein the ultraviolet light and visible light pass through the filter (100) of claim 10 and the ultraviolet light is filtered prior to reaching the compound.

17. The method of claim 16, wherein a temperature above the filter is maintained between about 5° C. to about 40° C.

18. The method of claim 16, wherein the compound is exposed to at least about 200 W*h/m$^2$ of ultraviolet light.

19. The method of claim 16, wherein the compound is exposed to at least about 1.2 million Lux*h visible light.

20. The method of claim 16, wherein the compound is exposed to at least about 1.2 million Lux*h of visible light but not more than about 500 W*h/m$^2$ of ultraviolet light.

* * * * *